June 13, 1939.  E. DALAND ET AL  2,161,801

ROTARY WING AIRCRAFT

Filed April 18, 1935   2 Sheets-Sheet 1

INVENTORS.
ELLIOT DALAND.
HAROLD A. BACKUS.
BY Frank H. Borden
ATTORNEY.

June 13, 1939.  E. DALAND ET AL  2,161,801

ROTARY WING AIRCRAFT

Filed April 18, 1935  2 Sheets-Sheet 2

INVENTORS.
ELLIOT DALAND.
HAROLD A. BACKUS.
BY Frank H. Borden
ATTORNEY

Patented June 13, 1939

2,161,801

UNITED STATES PATENT OFFICE 2,161,801

ROTARY WING AIRCRAFT

Elliot Daland, Philadelphia, and Harold A. Backus, Merion, Pa.

Application April 18, 1935, Serial No. 17,006

10 Claims. (Cl. 244—18)

This invention relates to rotary wing aircraft and particularly to the hubs for the rotors and control in the hub of feathering blades of normally aerodynamically driven rotary wing systems.

The purpose and object of this invention includes, among others, the following: to supply a compact, light and rugged rotor hub which contains also a simple and efficient mechanism for controlling the incidence of the blades as they revolve, and also to provide for offsetting the axis of control effect angularly from the axis of control operation to correct for gyroscopic and other moments.

Figure 2:
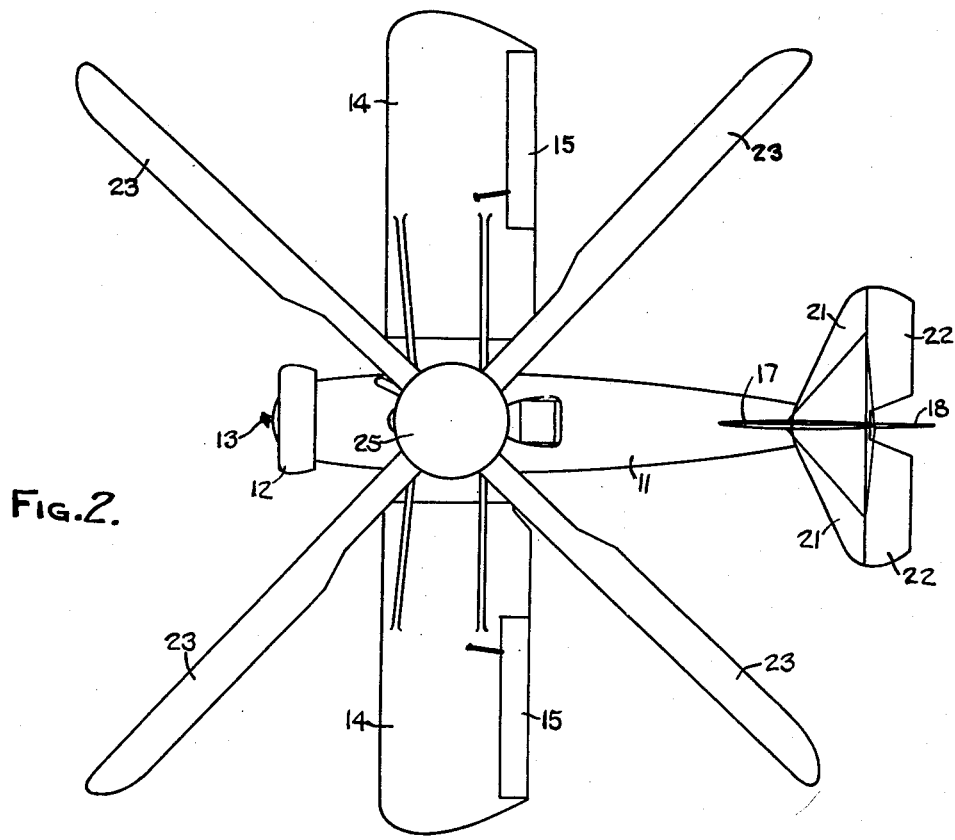
Figure 1:
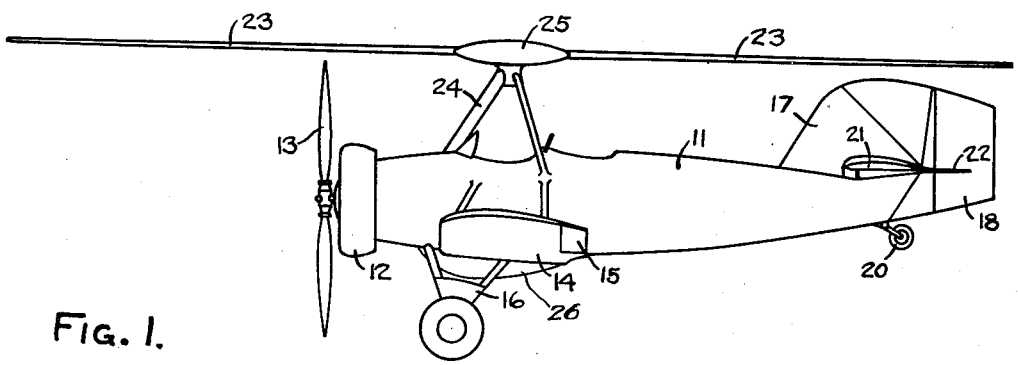
Figure 4:
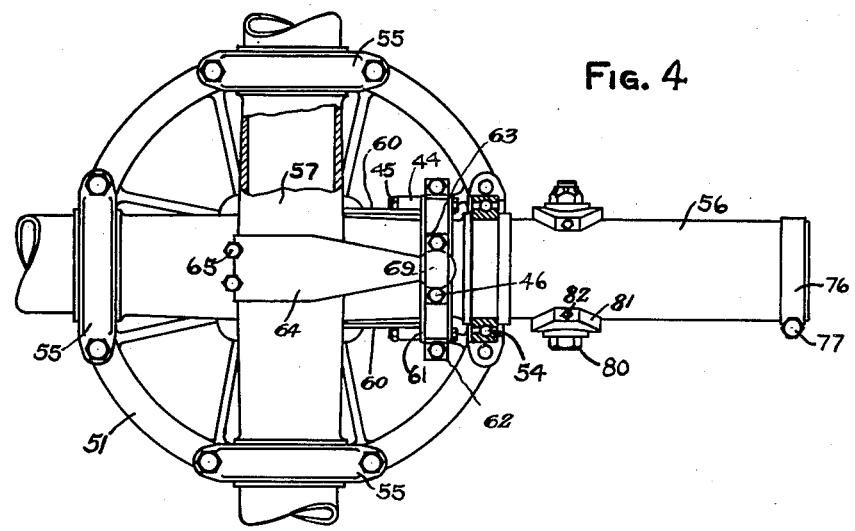
Figure 3:
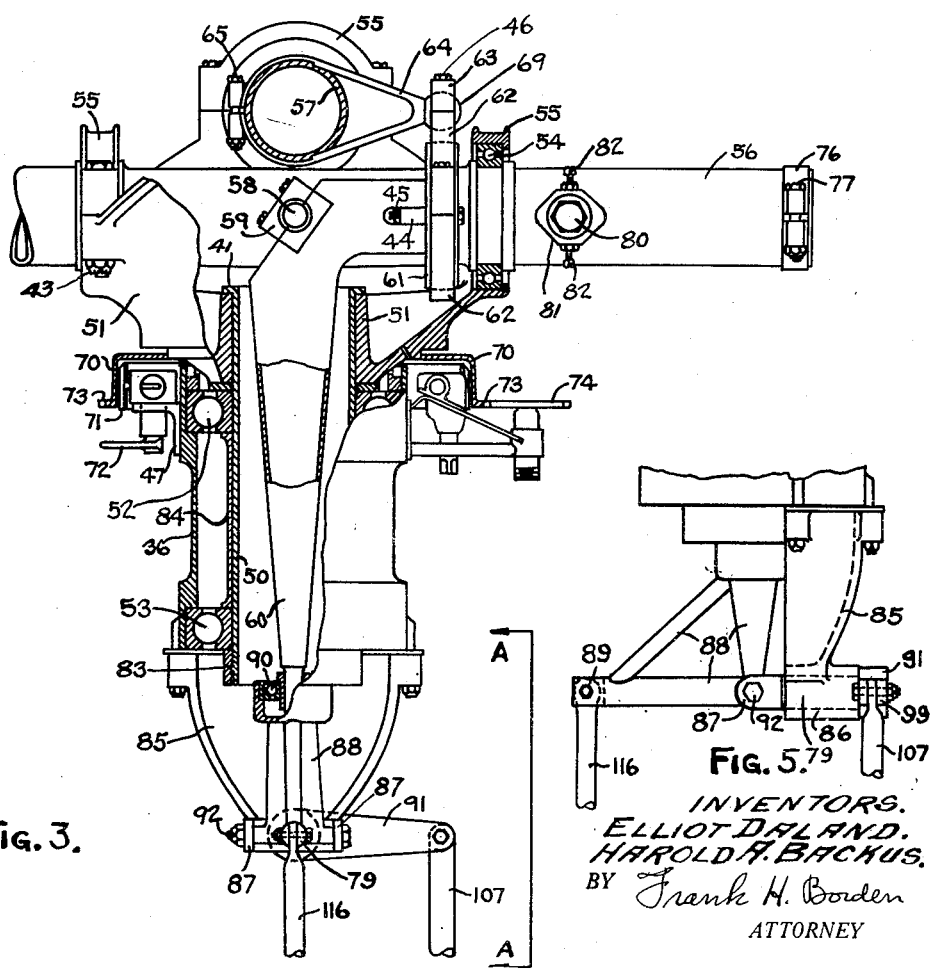
Figure 5:
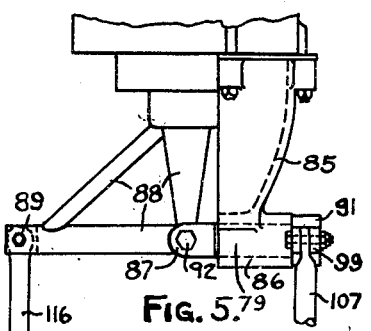

How the foregoing objects, and many others, are secured will be apparent from the following description and by reference to the drawings, in which Fig. 1 is a side view of an aircraft in which this invention is incorporated, Fig. 2 is a top or plan view of the aircraft shown in Fig. 1, Fig. 3 is a more enlarged side view of the hub mounted on the pylon and used in the aircraft shown in Fig. 1 partially in section, Fig. 4 is a top or plan view of the hub shown in Fig. 3, to the same enlarged scale and shown partially in section, and Fig. 5 is a view of the lower part of the hub taken on a plane at right angles to the plane of Fig. 3 indicated by the lines AA in Fig. 3.

Referring to Fig. 1 the body 11, in which the passengers are accommodated, is provided with an engine located at the front end under cowl 12, which drives propeller 13. The body 11 may also be provided with wings 14 and ailerons 15, landing gear and wheels 16, fixed vertical fin 17, movable rudder 18, tail skid or wheel 20, and, as best shown in Fig. 2, fixed or adjustable horizontal stabilizer 21 and movable elevator 22.

Mounted above the body 11 and slightly behind the center of gravity of the machine is the rotor consisting of blades 23, mounted on pylon 24 by means of a hub covered by the cowling 25.

Referring to Fig. 3 the shell 36 is bolted fixedly to the pylon (24 in Fig. 1). In this shell 36 the axle shaft 50 of the rotor runs on bearings 52 and 53 fitted into the shell 36 and fitting over the axle 50. The axle 50 is pressed down into hub casting 51, and casting 51 is prevented from pulling up over axle 50 by flange 41 which may be welded to the end of the axle.

The casting 51 is recessed to receive the four bearings 54 in spaced relation and held in place by the caps 55 and bolts 43. In these bearings 54 the center section tubes 56 and 57 are disposed at right angles to each other, but spaced so that tube 57 passes over tube 56. These center section tubes 56 and 57 receive the ends of the four blades (23 in Figs. 1 and 2) and they must be of sufficient strength to carry all moments and centrifugal forces from the blades.

At the center of tube 56 pin 58 passes through the tube 56 and also through a bearing 59 fixed to the stick or pilot's control member 60. Stick member 60 is an L shaped piece, the lower part of which is round and tapered, and the upper part, extending to the right in Fig. 3, consists of two spaced flat sections shown at 60 in Fig. 4, and comprising integral prolongations of the rounded lower part of the control stick. Attached to these two flat sections of 60, by means of lugs 44 and bolts 45, is the ring 61 whose outer surface is that of a slice of a sphere and whose inside surface is an elongated hole wide enough to allow tube 56 to pass through, and is long enough, up and down, to allow about ten degrees of motion of the stick 60 about the pin 58. Clamped around the outside of ring 61 is the strap 62 which fits the spherical surface of 61 and is split for purposes of assembly and of taking up wear. The upper end of strap 62 is recessed to receive the ball 69 held in place by cap 63 by means of bolts 46. The ball 69 forms the end of the arm 64 which is clamped rigidly to the upper center section 57 by clamp bolts 65.

It is easily seen that the lower end of the stick 60 can be moved in any direction inside of the axle 50. It moves in the plane of the sheet in Fig. 3, about pin 58, and moves in a plane perpendicular to the sheet in Fig. 3, about the center of tube 56 on bearing 54. When it is moved about pin 58 it raises and lowers ring 61 and strap 62 and ball 69 thereby rotating upper center section 57 through lever 64.

Attached to casting 51 is the brake drum 70 which revolves with the rotor. The brake 71 is anchored on the shell 36 by bracket 47 and is operated by rotating lever 72. The ring gear 73 is attached to the brake drum 70 and engages the pinion 74 which drives the tachometer shaft (not shown).

Bolted to the lower end of shell 36 is the supporting bracket 85 which supports the bearing 86 (see Fig. 5). In this bearing a shaft 79 is journalled which is an integral part of the yoke 87. Pinned in this yoke 87 by the bolt 92 is the bellcrank lever 88. The vertical arm of the bellcrank lever 88 carries a self aligning ball 90, with a spherical seat, the inside race of which fits slidably on the cylindrical lower end of the stick 60. The horizontal arm of the bellcrank 88 is connected by a universal joint 89 to the control tube 116 operated by the pilot. The shaft 79 of yoke 87 passes through bearing 86 and has arm 91 fastened to it. Arm 91 is connected by a universal joint 99 to control tube 107 which is operated by the pilot.

By rotating the position of bracket 85, Figs. 5 and 3, with relation to shell 36 and consequently to the axes of the airplane, the maximum intensity of control can be made to occur at any desired angle from the main axis of pitch and roll. This is done to provide a corrective controlling moment to offset the precessional couple caused by the gyroscopic effect of a pitch or roll on the rotating mass of the rotor. It has been found with masses and speeds now in use that thirty to fifty degrees angle of lead to the control effectually eliminates the effect of gyroscopic precession.

We claim:

1. In rotary wing aircraft with two pairs of feathering blades, upper and lower shafts disposed one above the other, at 90° to each other, one pair of blades interconnected by each of said shafts, a lever pinned to the lower shaft, an arm on said lever extending along said lower shaft, a spherical ring surrounding said lower shaft and engaged by said arm and a lever fastened to the upper shaft engaged operatively by said ring for the purpose of changing the angle of incidence of blades attached to said shaft.

2. In aircraft having a rotary wing system with a plurality of blades, each blade comprised of an operative section which changes its incidence during rotation, a plurality of shafts operatively associated with the operative sections which shafts may be twisted to cause a change of incidence of said sections throughout their whole length, an arm on one of said shafts and a lever pinned to another of said shafts and linked to said arm on the first mentioned shaft and revolving with the whole rotor, and the whole so arranged as to cause each of said shafts to twist periodically during rotation when the lever is angularly disposed.

3. In aircraft having a rotary wing system consisting of a plurality of blades revolving about a common hub, shafts journaled in the hub, each blade comprising an outer portion movable as a whole and operated by said shafts arranged to be twisted to produce movement of the outer portion, a control consisting of a lever pinned to one of said shafts and linked to another shaft and revolving with the rotor and which causes each of the shafts to twist periodically during rotation when the lever is displaced.

4. In rotary wing aircraft, a rotor having feathering blades which change their incidence during rotation, a control whose axis of application is angularly disposed to the axis of the resulting blade motion for the purpose of substantially counteracting the gyroscopic precession due to control about the axis of application and means for predeterminedly and variably associating the rotor and control to secure a predetermined counteraction of precession.

5. In rotary wing aircraft, a hub in which a plurality of blades are journalled and a lever pivoted to one blade and linked to the others changes the angles of incidence during the revolution of the blades, said lever revolving with the blades, and an arm relatively stationary and engaging the end of said lever by means of a universal bearing, said arm being capable of positioning the free end of said revolving lever in any transverse direction.

6. In rotary wing aircraft, a rotary system having blades in which the major weight of the aircraft is carried by bending in the spars and whose controllability is derived from differential changes of incidence of blades on opposite sides of the rotor axis in both positive and negative directions to produce controlling moments, a hub in which is journalled a center section common to each of a pair of blades, a pin passing through both center section and blade spar which retains the blade against centrifugal force, and a system of set screws which changes the angle of incidence of the blade.

7. In rotary wing aircraft, a rotary system having blades in which the major weight of the aircraft is carried by bending in the spars and whose controllability is derived from differential changes of incidence of blades on opposite sides of the rotor axis in both positive and negative directions to produce controlling moments, a hub in which a center section is journalled which is common to each of a pair of blades, a pin connecting said center section with a lever for the purpose of twisting the center section for changing the angle of incidence of the blades, a lever movable about the axes of the pin and center section, and control means arranged to swing the lever end universally about a vertical axis passing through the axes of the pin and center section.

8. In rotary wing aircraft, a hub, a blade shaft mounted for feathering on and relative to said hub in each direction from a given position, a lever pivoted to said shaft and projecting downward through the hub and arranged to swing on said pivot on both sides of the vertical, the lower end of the lever being movable in every transverse direction from a position of substantial verticality for securing an incidence change at any phase angle as a resultant of feathering of the blade shaft and swinging of the lever.

9. In rotary wing aircraft, a hub, a center section journalled in the hub, a blade spar mounted telescopically on the center section, means for varying the angular relation of the section and spar to establish or vary the pitch angle of the blade on the spar which is independent of control, and means for changing the angular disposition of the center section and blade spar as a unit on each side of a given normal disposition, for control.

10. In rotary wing aircraft, a hub, a center section journalled in the hub, a blade coupled to the center section, means manually operable by the pilot connected operatively with the center section to oscillate same to change the angle of incidence of said blade positively and negatively on each side of a neutral angle of incidence, and settable means for varying the fundamental neutral angle relative to which the manual positive and negative control is secured.

HAROLD A. BACKUS.
ELLIOT DALAND.